US009569598B2

(12) United States Patent
Abuelsaad et al.

(10) Patent No.: US 9,569,598 B2
(45) Date of Patent: *Feb. 14, 2017

(54) SOFTWARE LICENSE MANAGEMENT IN A NETWORKED COMPUTING ENVIRONMENT

(71) Applicant: International Business Machines Corporation, Armonk, NY (US)

(72) Inventors: Kelly Abuelsaad, Poughkeepsie, NY (US); Lisa Seacat DeLuca, San Francisco, CA (US); Soobaek Jang, Hamden, CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/944,353

(22) Filed: Nov. 18, 2015

(65) Prior Publication Data

US 2016/0078202 A1 Mar. 17, 2016

Related U.S. Application Data

(63) Continuation of application No. 13/356,667, filed on Jan. 24, 2012, now Pat. No. 9,245,096.

(51) Int. Cl.
*G06F 21/10* (2013.01)
*G06F 21/12* (2013.01)
(Continued)

(52) U.S. Cl.
CPC .............. *G06F 21/105* (2013.01); *G06F 8/61* (2013.01); *G06F 21/10* (2013.01); *G06F 21/126* (2013.01);
(Continued)

(58) Field of Classification Search
CPC .... G06F 21/10; G06F 21/126; G06F 9/44505; G06F 8/61; G06F 9/45533; G06F 21/105; H04L 67/10
See application file for complete search history.

(56) References Cited

U.S. PATENT DOCUMENTS 4,937,863 A * 6/1990 Robert .................. G06F 21/105
705/59
5,375,206 A 12/1994 Hunter et al.
(Continued)

FOREIGN PATENT DOCUMENTS

CN 102103518 A 6/2011
CN 102270290 A 12/2011

OTHER PUBLICATIONS

Maitland, J., "Keeping Control Isn't Easy", Chapter 4: Cloud-Based Infrastructure, SearchCloudComputing.com, Oct. 2009, 17 pages.
(Continued)

*Primary Examiner* — Theodore C. Parsons
*Assistant Examiner* — James J Wilcox
(74) *Attorney, Agent, or Firm* — William H. Hartwell; Maxine L. Barasch; Keohane & D'Alessandro PLLC

(57) ABSTRACT

An approach for managing licenses for software installations on virtual machine (VM) instances in a networked computing environment (e.g., a cloud computing environment) is provided. Specifically, in one example, data (e.g., real-time and/or historical) pertaining to usage of a set of software installations on a set of (VM) instances in the networked computing environment is collected. When a request is received (e.g., from a requester) for a license for a particular software installation of the set of software installations, it is determined whether the license is available. If not, it is then determined whether the license is obtainable based on the collected data and a current configuration of the networked computing environment. Then, responsive to the license being obtainable, the requested license may be allocated.

20 Claims, 6 Drawing Sheets

(51) Int. Cl.
  *H04L 29/08* (2006.01)
  *G06F 9/455* (2006.01)
  *G06F 9/445* (2006.01)
(52) U.S. Cl.
  CPC ........... *H04L 67/10* (2013.01); *G06F 9/44505* (2013.01); *G06F 9/45533* (2013.01)

(56) References Cited

U.S. PATENT DOCUMENTS

| | | | |
|---|---|---|---|
| 6,009,401 A * | 12/1999 | Horstmann | G06F 21/10 705/317 |
| 6,859,793 B1 | 2/2005 | Lambiase | |
| 6,981,252 B1 | 12/2005 | Sadowsky | |
| 7,100,204 B1 | 8/2006 | Myllymaki et al. | |
| 7,483,958 B1 * | 1/2009 | Elabbady | G06F 21/10 709/217 |
| 7,565,325 B2 * | 7/2009 | Lenard | G06F 21/105 705/59 |
| 7,865,442 B1 * | 1/2011 | Sowell | G06F 21/105 705/52 |
| 8,028,048 B2 | 9/2011 | Karve et al. | |
| 8,041,642 B2 | 10/2011 | Lenard et al. | |
| 8,126,814 B2 | 2/2012 | Yellai et al. | |
| 8,561,131 B1 * | 10/2013 | Broekhuijsen | G06Q 30/018 705/29 |
| 8,612,615 B2 | 12/2013 | Ferris et al. | |
| 8,650,246 B2 | 2/2014 | Koenig | |
| 8,732,841 B2 | 5/2014 | Ronning et al. | |
| 8,781,970 B2 | 7/2014 | Boomershine et al. | |
| 8,788,316 B1 | 7/2014 | Karnik et al. | |
| 8,856,951 B2 | 10/2014 | Yuki | |
| 9,047,161 B1 * | 6/2015 | Burr | G06F 8/60 |
| 9,104,844 B2 | 8/2015 | Fang et al. | |
| 9,117,057 B2 | 8/2015 | Marsnik et al. | |
| 2001/0013024 A1 | 8/2001 | Takahashi et al. | |
| 2002/0069172 A1 * | 6/2002 | Omshehe | G06F 17/30873 705/51 |
| 2003/0083892 A1 * | 5/2003 | Ramachandran | G06Q 30/06 705/26.1 |
| 2003/0135474 A1 * | 7/2003 | Circenis | G06Q 30/04 705/400 |
| 2004/0039916 A1 * | 2/2004 | Aldis | G06F 21/10 713/177 |
| 2004/0078339 A1 | 4/2004 | Goringe et al. | |
| 2005/0049973 A1 | 3/2005 | Read et al. | |
| 2005/0289072 A1 * | 12/2005 | Sabharwal | G06F 21/121 705/59 |
| 2006/0059561 A1 | 3/2006 | Ronning et al. | |
| 2006/0179058 A1 * | 8/2006 | Bram | G06F 21/121 |
| 2006/0287960 A1 * | 12/2006 | Marsnik | G06Q 10/04 705/59 |
| 2007/0265982 A1 | 11/2007 | Kalervo et al. | |
| 2007/0288389 A1 * | 12/2007 | Vaughan | G06F 21/10 705/59 |
| 2008/0052295 A1 * | 2/2008 | Walker | G06F 21/10 |
| 2008/0244600 A1 * | 10/2008 | Wong | G06F 9/5083 718/104 |
| 2009/0055835 A1 * | 2/2009 | Zhu | H04L 41/0896 718/105 |
| 2009/0276771 A1 | 11/2009 | Nickolov et al. | |
| 2010/0174822 A1 | 7/2010 | Norwood et al. | |
| 2010/0205303 A1 | 8/2010 | Chaturvedi et al. | |
| 2011/0010216 A1 | 1/2011 | Bhogal et al. | |
| 2011/0047624 A1 | 2/2011 | Vedantam et al. | |
| 2011/0072431 A1 | 3/2011 | Cable et al. | |
| 2011/0121215 A1 | 5/2011 | Cha et al. | |
| 2011/0131315 A1 | 6/2011 | Ferris et al. | |
| 2011/0213691 A1 | 9/2011 | Ferris et al. | |
| 2011/0251937 A1 * | 10/2011 | Falk | G06F 21/10 705/34 |
| 2011/0289003 A1 * | 11/2011 | Womack | G06F 21/10 705/59 |
| 2011/0296402 A1 | 12/2011 | Hayman et al. | |
| 2013/0042003 A1 * | 2/2013 | Franco | H04L 67/1097 709/226 |
| 2013/0074189 A1 * | 3/2013 | Boudreau | G06F 21/105 726/26 |
| 2013/0103592 A1 * | 4/2013 | Shenk | G06Q 30/08 705/80 |
| 2013/0104125 A1 | 4/2013 | Sarma et al. | |
| 2013/0191923 A1 | 7/2013 | Abuelsaad et al. | |
| 2013/0346899 A1 * | 12/2013 | Cole | G06F 3/0482 715/771 |
| 2014/0068041 A1 | 3/2014 | Obligacion | |
| 2014/0101061 A1 * | 4/2014 | Boudreau | G06F 21/10 705/317 |
| 2014/0122348 A1 * | 5/2014 | Fuller | G06Q 30/06 705/317 |
| 2014/0137261 A1 * | 5/2014 | Chen | G06F 21/105 726/26 |
| 2014/0297865 A1 * | 10/2014 | Deore | H04L 47/788 709/226 |
| 2015/0178514 A1 * | 6/2015 | Song | G06Q 10/0631 705/310 |

OTHER PUBLICATIONS

Mell et al., "The NIST Definition of Cloud Computing", National Institute of Standards and Technology, Information Technology Laboratory, Version 15, Oct. 7, 2009, 2 pages.

Anandasivam, A. et al., "Bid Price Control and Dynamic Pricing in Clouds", London School of Economics; Proceedings of the European Conference on Information Systems (2009), 13 pages.

Xiao Qi Zhi, "Information Materials for IDS", CN Office Action Dated Jun. 2, 2015, 4 pages.

James J. Wilcox, USPTO Office Action, U.S. Appl. No. 13/356,667, Notification Date Jul. 23, 2014, 56 pages.

James J. Wilcox, USPTO Final Office Action, U.S. Appl. No. 13/356,667, Notification Date Feb. 11, 2015, 53 pages.

James J. Wilcox, USPTO Office Action, U.S. Appl. No. 13/356,667, Notification Date May 20, 2015, 66 pages.

James J. Wilcox, USPTO Notice of Allowance and Fee(s) Due, U.S. Appl. No. 13/356,667, Date Mailed Sep. 11, 2015, 22 pages.

* cited by examiner

SOFTWARE LICENSE MANAGEMENT IN A NETWORKED COMPUTING ENVIRONMENT

CROSS-REFERENCE TO RELATED APPLICATION

This application is a continuation of, and claims the benefit of, co-owned U.S. patent application Ser. No. 13/356,667, now U.S. Pat. No. 9,245,096, filed Jan. 12, 2012, the entire contents of which are herein incorporated by reference.

TECHNICAL FIELD

In general, embodiments of the present invention provide an approach for software license management. Specifically, embodiments of the present invention relate to management licenses for software installations on virtual machine instances in a networked computing environment.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Challenges may exist, however, in implementing efficient software license allocation in a cloud computing environment. For example, in a typical cloud computing environment, a license is allocated per virtual machine (VM) or VM image/instance rather than being allocated for each software installation running on a particular VM (or VM instance). Given that multiple software installations may be running on a single VM instance, providing a single license for the entire VM instance may greatly limit usage of that VM instance.

SUMMARY

In general, embodiments of the present invention provide an approach for managing licenses for software installations on virtual machine (VM) instances in a networked computing environment (e.g., a cloud computing environment). Specifically, in a typical embodiment, data (e.g., real-time and/or historical) pertaining to usage of a set of software installations on a set of (VM) instances in the networked computing environment is collected. When a request is received (e.g., from a requester) for a license for a particular software installation of the set of software installations, it is determined whether the license is available. If not, it is then determined whether the license is obtainable based on the collected data and a current configuration of the networked computing environment. Then, responsive to the license being obtainable, the requested license may be allocated.

A first aspect of the present invention provides a computer-implemented method for managing licenses for software installations on virtual machine instances in a networked computing environment, comprising: collecting, on a computer storage device, data pertaining to usage of a set of software installations on a set of virtual machine (VM) instances in the networked computing environment; receiving a request for a license for a particular software installation of the set of software installations from a requester; determining whether the license is available; determining, responsive to the license being unavailable, whether the license is obtainable based on the data and a current configuration of the networked computing environment; and allocating the license to the requester responsive to the license being obtainable.

A second aspect of the present invention provides a system for managing licenses for software installations on virtual machine instances in a networked computing environment, comprising: a memory medium comprising instructions; a bus coupled to the memory medium; and a processor coupled to the bus that when executing the instructions causes the system to: collect, on a computer storage device, data pertaining to usage of a set of software installations on a set of virtual machine (VM) instances in the networked computing environment; receive a request for a license for a particular software installation of the set of software installations from a requester; determine whether the license is available; determine, responsive to the license being unavailable, whether the license is obtainable based on the data and a current configuration of the networked computing environment; and allocate the license to the requester responsive to the license being obtainable.

A third aspect of the present invention provides a computer program product for managing licenses for software installations on virtual machine instances in a networked computing environment, the computer program product comprising a computer readable storage media, and program instructions stored on the computer readable storage media, to: collect, on a computer storage device, data pertaining to usage of a set of software installations on a set of virtual machine (VM) instances in the networked computing environment; receive a request for a license for a particular software installation of the set of software installations from a requester; determine whether the license is available; determine, responsive to the license being unavailable, whether the license is obtainable based on the data and a current configuration of the networked computing environment; and allocate the license to the requester responsive to the license being obtainable.

A fourth aspect of the present invention provides a method for deploying a system for managing licenses for software installations on virtual machine instances in a networked computing environment, comprising: providing a computer infrastructure being operable to: collect, on a computer storage device, data pertaining to usage of a set of software installations on a set of virtual machine (VM) instances in the networked computing environment; receive a request for a license for a particular software installation of the set of software installations from a requester; determine whether the license is available; determine, responsive to the license being unavailable, whether the license is obtainable based on the data and a current configuration of the networked computing environment; and allocate the license to the requester responsive to the license being obtainable.

BRIEF DESCRIPTION OF THE DRAWINGS

These and other features of this invention will be more readily understood from the following detailed description of the various aspects of the invention taken in conjunction with the accompanying drawings in which.

Figure 1:
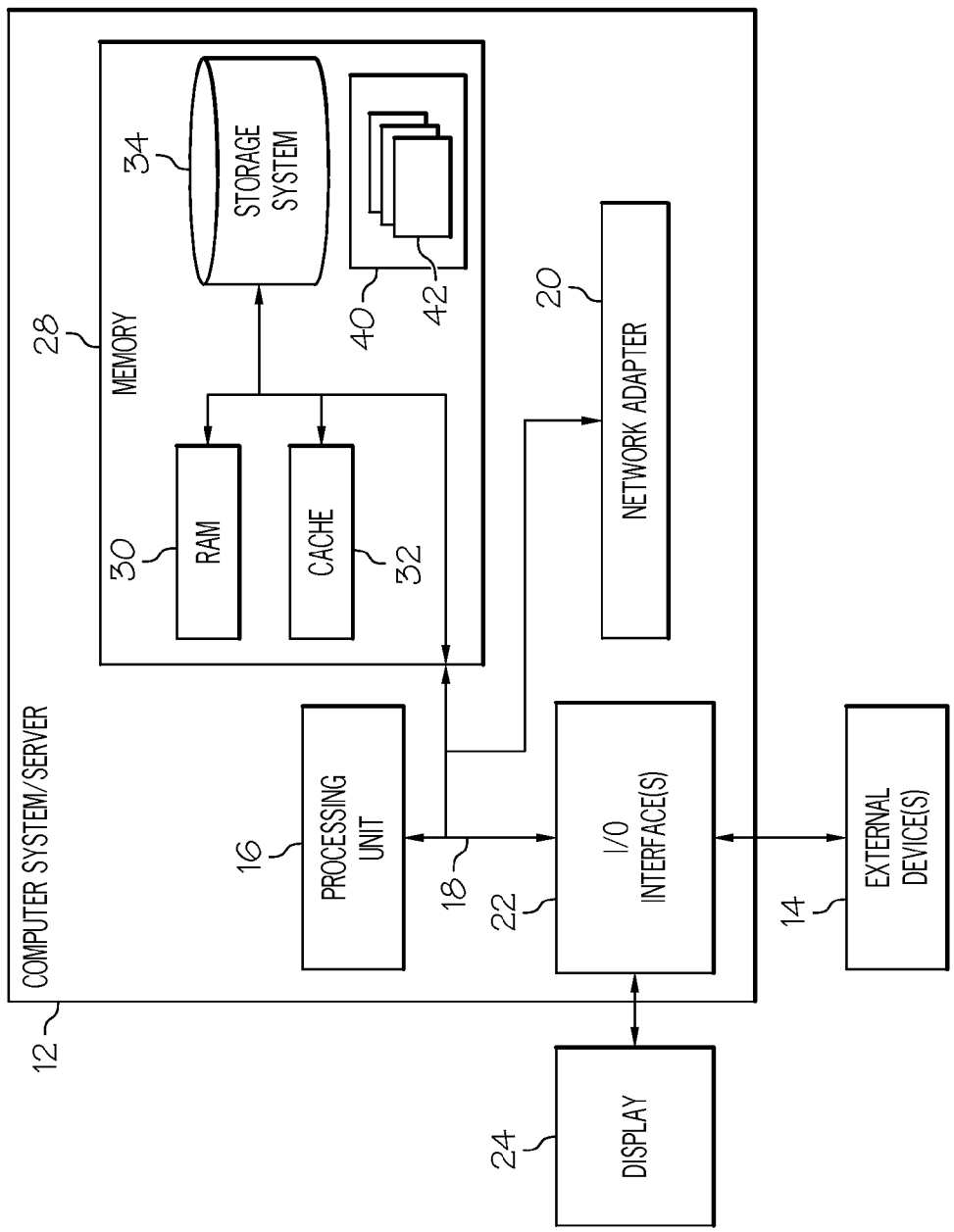
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for managing licenses for software installations on virtual machine (VM) instances in a networked computing environment (e.g., a cloud computing environment). Specifically, in a typical embodiment, data (e.g., real-time and/or historical) pertaining to usage of a set of software installations on a set of (VM) instances in the networked computing environment is collected. When a request is received (e.g., from a requester) for a license for a particular software installation of the set of software installations, it is determined whether the license is available. If not, it is then determined whether the license is obtainable based on the collected data and a current configuration of the networked computing environment. Then, responsive to the license being obtainable, the requested license may be allocated.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
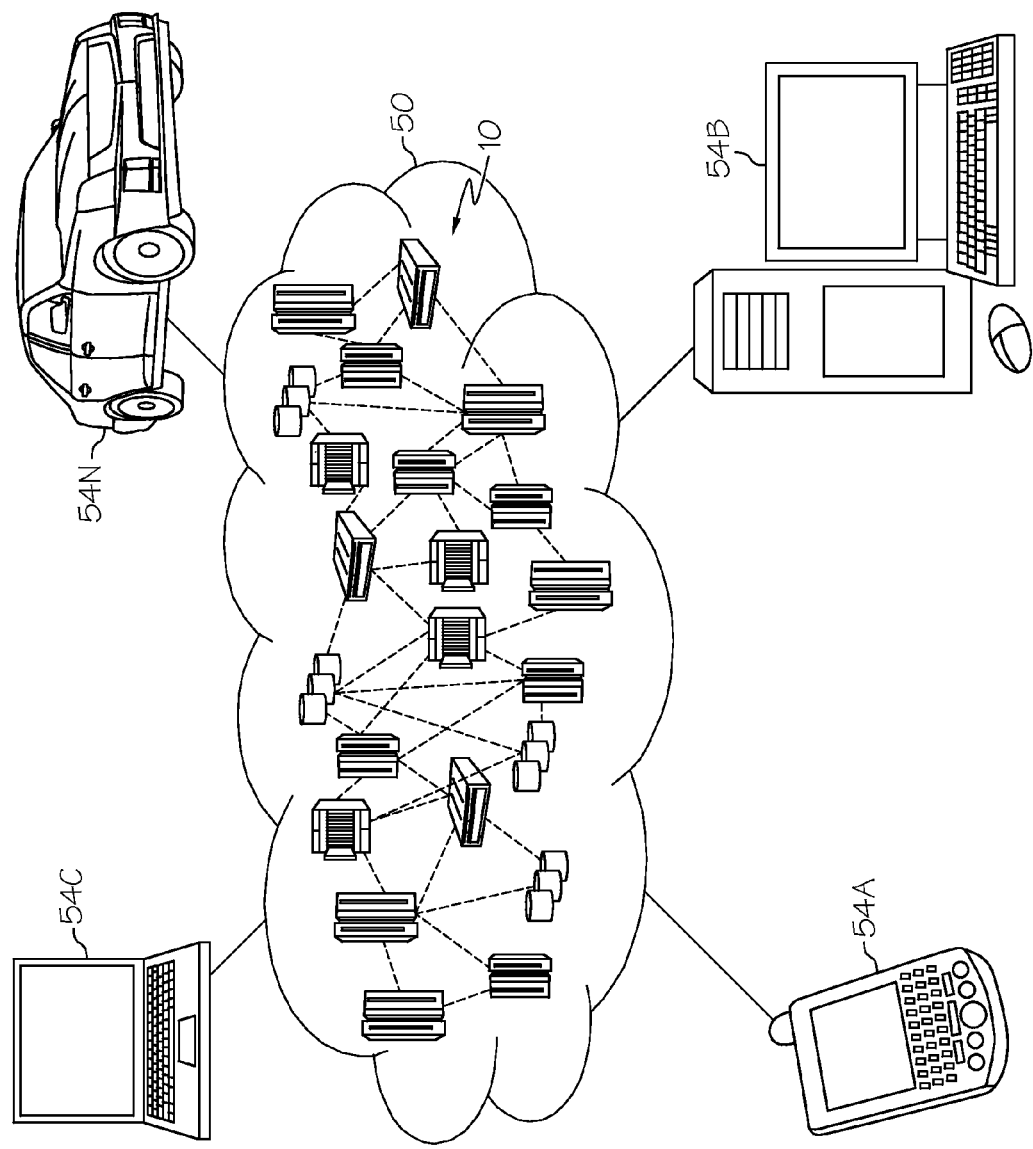
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
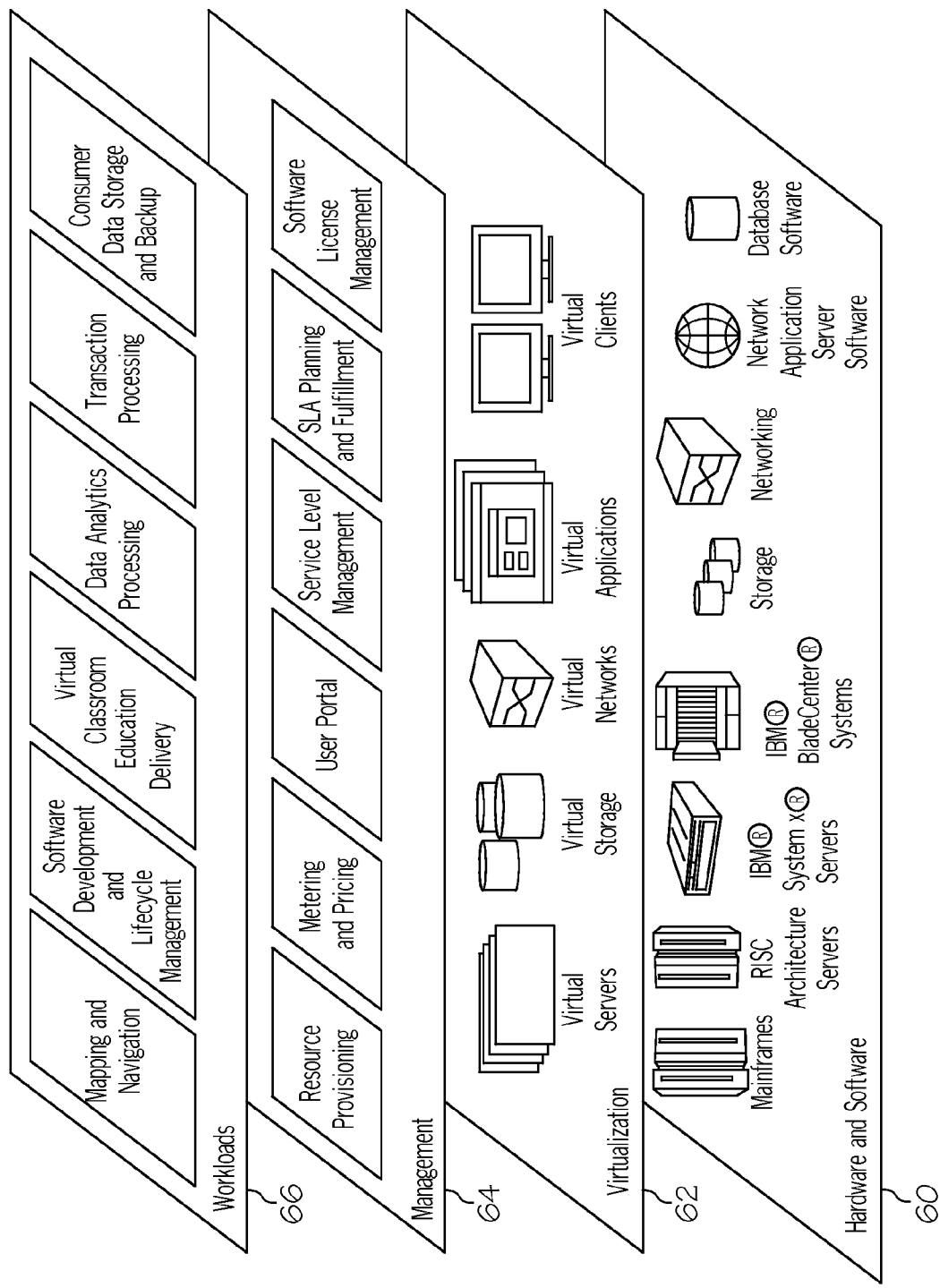
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is software license management, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the software license management functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
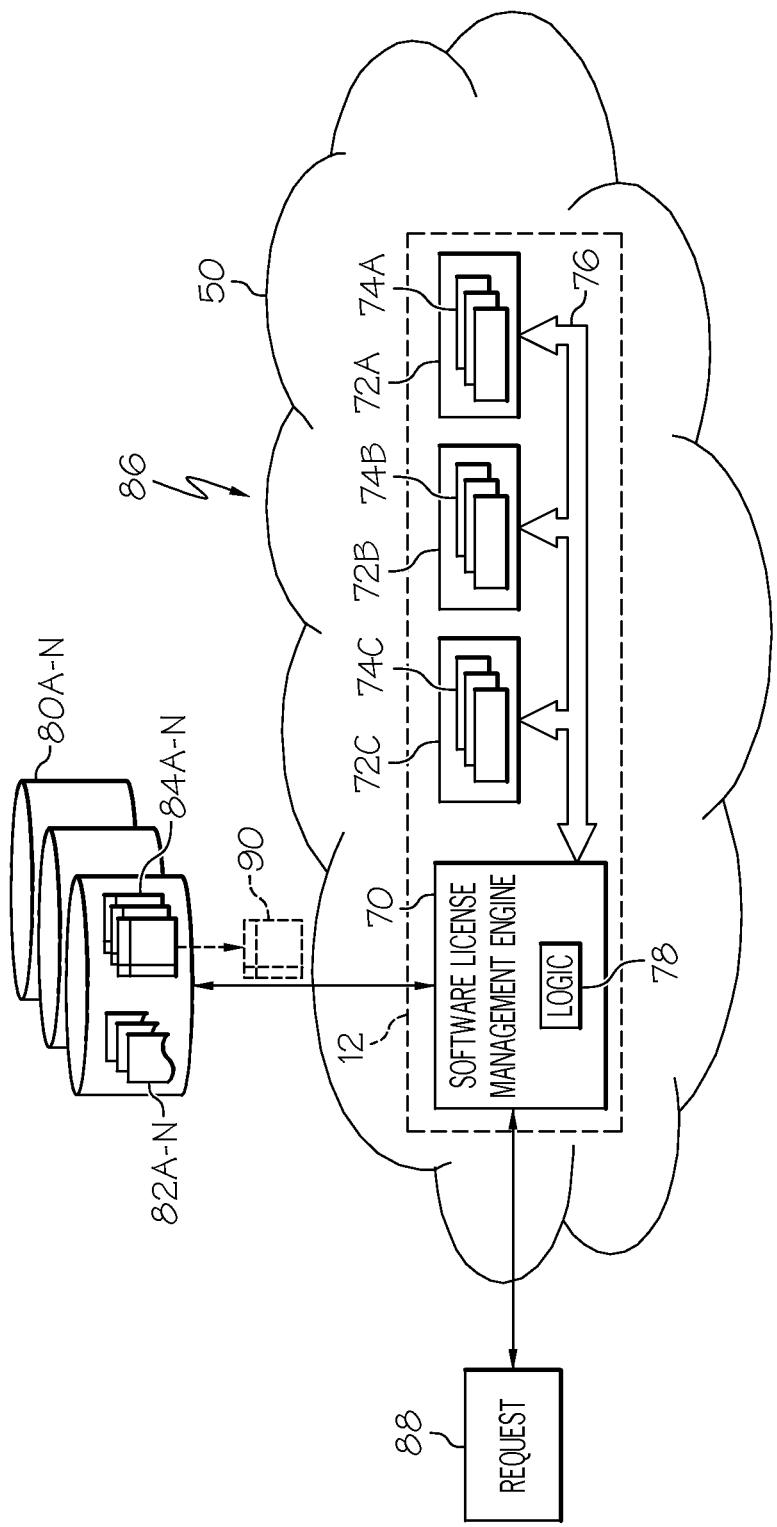
FIG. 4 depicts a system diagram according to an embodiment of the present invention.

Referring now to FIG. 4, a system diagram capable of implementing the functionality discussed herein according to an embodiment of the present invention is shown. It is understood that the teachings recited herein may be practiced within any type of networked computing environment 86 (e.g., a cloud computing environment 50). A stand-alone computer system/server 12 is shown in FIG. 4 for illustrative purposes only. In the event the teachings recited herein are practiced in a networked computing environment 86, each client need not have a software license management engine (engine 70). Rather, engine 70 could be loaded on a server or server-capable device that communicates (e.g., wirelessly) with the clients to provide software license management therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules and/or logic 78 and/or provides software license management functions hereunder.

Along these lines, engine 70 may perform multiple functions similar to a general-purpose computer. Specifically, among other functions, engine 70 may (among other things): collect, on a (one or more) computer storage device 80A-N, data 82A-N (historical and/or real-time) pertaining to usage (e.g., a set of characteristics pertaining to the usage) of a set of software installations 74A-C (having associated licenses 84A-N) on a set of virtual machine (VM) instances 72A-C connected via communication link 76 in the networked computing environment 86; receive a request 88 for a license 90 for a particular software installation of the set of software installations 74A-C (e.g., from a requester); determine whether the license 90 is available; determine, responsive to the license 90 being unavailable, whether the license 90 is obtainable based on the data 82A-N, an organizational license policy, and/or a current configuration of the networked computing environment 86 (e.g., inactivity of licenses 84A-N, priority of users for using the licenses 84A-N, frequency of use of the set of software installations 74A-B, geographic location of the users, or datacenter location within the networked computing environment); and/or allocate the license 90 (e.g., with a predetermined expiration time) to the requester responsive to the license 90 being obtainable.

ILLUSTRATIVE EXAMPLE

The following list comprises an illustrative sequence of steps that may be performed by implementing the embodiments of the invention in a cloud computing environment. It is understood that this sequence is intended to be illustrative only and that other variations may exist under the embodiments of the present invention.
 1. A cloud service provider implements engine 70.
 2. Historical and real time information 82A-N are substantially continuously gathered about software usage within the cloud resources. Such data may comprise and/or identify a set of characteristics pertaining to the software usage such as:
   A. Installed software
     e.g., Instance X has WebSphere Application Server® (WAS®) installed (WebSphere Application Server, WAS, and related terms are trademarks of International Business Machines Corporation in the United States and/or other countries).
   B. Uptime/runtime of software installations
     e.g., Instance X has but WAS is currently not running
   C. Uptime/runtime of instances
     e.g., Instance X has WAS but Instance X is stopped.
   D. Software un-installation
     e.g., WAS is uninstalled from Instance X.
   E. Network usage
     e.g., WAS might be installed but it has little network activity and could therefore be a candidate to be turned off.
 3. Organization license policies are maintained.
 4. As a new user, "A" requests a license 90 for software installation "N", the engine 70 looks up the allocated licenses for N 84A-N.
 5. If license 90 is available for "N", user A is given/allocated the license.
 6. If license 90 is not available for N, the system determines (e.g., using data 82A-N collected in step 2) whether or not license 90 can be obtained (e.g., not readily available on a license service, but one can be acquired from another source) from within the current configuration of the networked computing environment 86 (e.g., the cloud computing environment). Such a configuration may be based on one or more of the following:
   A. Inactivity—the system might find a license is inactive. In such a case, the license 90 can be permanently or temporarily given to user A.
   B. Priority of users—user A might have a higher priority for needing the license 90 over another user B in which case B's license can be given to A.
   C. Software usage—if the license is requested for a piece of software that is installed on an instance but never used (little/low usage), the system could do one or more of the following:
     1. Stop/pause the process on the instance.
     2. Un-install the software.
     3. Stop/pause the instance.
   D. Geographic location—if a user is in a location in which the terms of the license have changed the license can be adjusted
   E. Datacenter location—similar to geographic location, but the license 90 might change depending on the data center at which the underlying cloud resource is located.
 7. Optionally, the system could offer temporary licensing incentives.
   A. License expiration—The license 90 expires after a predicted down time (e.g., only valid for 5 hours during the evening).
   B. Runtime license—The license 90 is a temporary license and will be revoked when a previous user needs the license again.
 8. An optional alert and authorization system could be in place to handle license disputes or situations in which a manual adjustment may be required.
 9. The system may continually monitor and adjust license and associated pricing accordingly.

Figure 5:
FIG. 5 depicts a virtual image according to an embodiment of the present invention.

Referring now to FIG. 5, an illustrative user interface depicting properties of a virtual image 100 having the following exemplary software configuration:
 Red Hat Enterprise Linux
 WebSphere Application Server
 DB2® (DB2 is a trademark of International Business Machines Corporation in the United States and/or other countries)
 Tomcat
 WebSphere MQ® (WebSphere MQ is a trademark of International Business Machines Corporation in the United States and/or other countries).

Assume that an organization associated with virtual image 100 has the following licenses:
 Red Hat Enterprise Linux—500 licenses
 WebSphere Application Server—100 licenses
 DB2—100 licenses
 Tomcat—unlimited licenses
 WebSphere MQ—5 licenses Rather than the organization allowing only five instances of images to be created (e.g., because only five WebSphere MQ licenses are allocated to the organization), the organization may implement the above teachings to actively and dynamically monitor license usage. This may allow, for example, the organization to have 100 active instances running, but only five of those instances might have WebSphere MQ running. Similarly, rather than only 500 instances of Red Hat Enterprise Linux to run, the teachings recited herein could allow any desired number of such instances to run.

Figure 6:
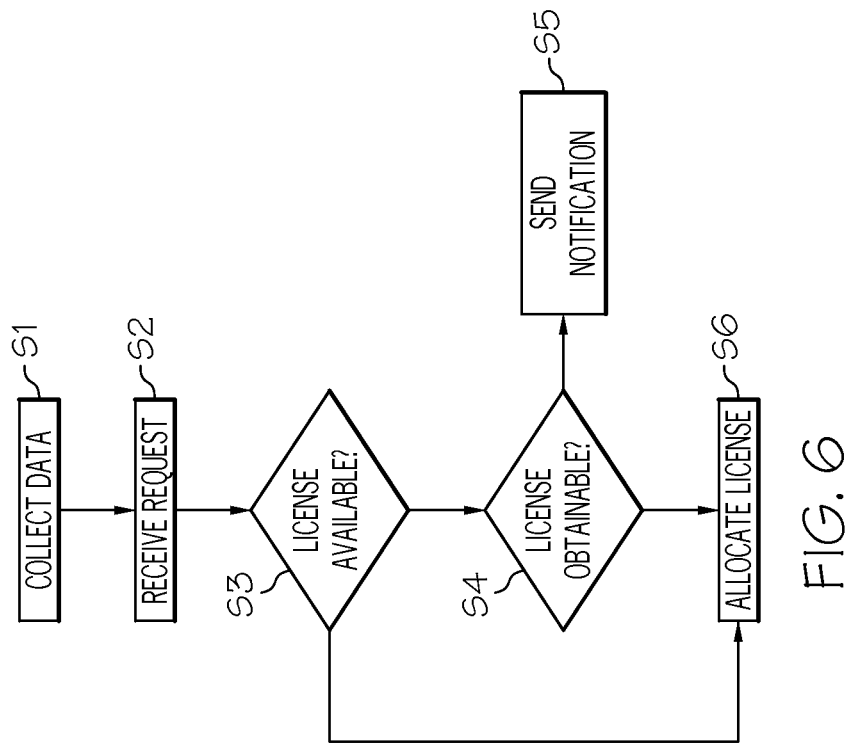
FIG. 6 depicts a method flow diagram according to an embodiment of the present invention.

Referring now to FIG. 6, a method flow diagram according to an embodiment of the present invention is shown. In step S1, data pertaining to usage of a set of software installations on a set of virtual machine (VM) instances in the networked computing environment is collected on a computer storage device. In step S2, a request is received (e.g., from a requester) for a license for a particular software installation of the set of software installations from a requester. In step S3, it is determined whether the license is available. If so, the license is allocated in step S6. If not, it is determined in step S4 whether the license is obtainable (e.g., from a source other than a license service with a license readily available) based on the data and a current configuration of the networked computing environment. If not, a notification may be sent in step S5 to the requester. If so, the obtained license may be allocated in step S6.

While shown and described herein as a software license management solution, it is understood that the invention further provides various alternative embodiments. For example, in one embodiment, the invention provides a computer-readable/useable medium that includes computer program code to enable a computer infrastructure to provide software license management functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide software license management functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for software license management. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for managing licenses for software installations on virtual machine instances in a networked computing environment, comprising:

collecting, on a computer storage device, data pertaining to usage of a set of software installations on a set of virtual machine (VM) instances running on cloud resources in the networked computing environment;

receiving a request for a license for a particular software installation of the set of software installations from a requester;

determining whether the license is available from a license service;

evaluating, responsive to the license being unavailable, whether the license is obtainable from a source other than the license service based on the data and a current configuration of the networked computing environment, wherein the evaluating comprises:

determining that changes have been made to terms of the license in a particular geographic location, and determining that changes have been made to terms of the license based on a datacenter where the cloud resources are located; and responsive to the license being obtainable, allocating the license from the source other than the license service, with adjustments made based on the changes, to the requester.

2. The computer-implemented method of claim 1, the data comprising historical data and real-time data identifying a set of characteristics pertaining to the usage of the set of software installations.

3. The computer-implemented method of claim 2, the set of characteristics comprising at least one of the following: identification of the set of software installations, runtime of the set of software installations, runtime of the set of VM instances, un-installation of any of the set of software installations, or network usage associated with the set of software installations.

4. The computer-implemented method of claim 1, the allocating comprising allocating the license with a predetermined expiration time.

5. The computer-implemented method of claim 1, the evaluating of whether the license is obtainable being further based on an organizational license policy associated with the requester.

6. The computer-implemented method of claim 1, the networked computing environment comprising a cloud computing environment.

7. The computer-implemented method of claim 1, wherein a solution service provider provides a computer infrastructure operable to perform the method.

8. A system for managing licenses for software installations on virtual machine instances in a networked computing environment, comprising:
  a memory medium comprising instructions;
  a bus coupled to the memory medium; and
  a processor coupled to the bus that when executing the instructions causes the system to:
    collect, on a computer storage device, data pertaining to usage of a set of software installations on a set of virtual machine (VM) instances running on cloud resources in the networked computing environment;
    receive a request for a license for a particular software installation of the set of software installations from a requester;
    determine whether the license is available from a license service;
    evaluate, responsive to the license being unavailable, whether the license is obtainable from a source other than the license service based on the data and a current configuration of the networked computing environment, wherein the evaluating comprises:
      determine that changes have been made to terms of the license in a particular geographic location, and
      determine that changes have been made to the terms of the license based on a datacenter where the cloud resources are located; and
    responsive to the license being obtainable, allocate the license from the source other than the license service, with adjustments made based on the changes, to the requester.

9. The system of claim 8, the data comprising historical data and real-time data identifying a set of characteristics pertaining to the usage of the set of software installations.

10. The system of claim 9, the set of characteristics comprising at least one of the following: identification of the set of software installations, runtime of the set of software installations, runtime of the set of VM instances, un-installation of any of the set of software installations, or network usage associated with the set of software installations.

11. The system of claim 8, the memory medium further comprising instructions for causing the system to allocate the license with a predetermined expiration time.

12. The system of claim 8, the memory medium further comprising instructions for causing the system to evaluate whether the license is obtainable further based on an organizational license policy associated with the requester.

13. The system of claim 8, the networked computing environment comprising a cloud computing environment.

14. A computer program product for managing licenses for software installations on virtual machine instances in a networked computing environment, the computer program product comprising a computer readable hardware storage device, and program instructions stored on the computer readable storage media, to:
  collect, on a computer storage device, data pertaining to usage of a set of software installations on a set of virtual machine (VM) instances running on cloud resources in the networked computing environment;
  receive a request for a license for a particular software installation of the set of software installations from a requester;
  determine whether the license is available from a license service;
  evaluate, responsive to the license being unavailable, whether the license is obtainable from a source other than the license service based on the data and a current configuration of the networked computing environment, wherein the evaluating comprises:
    determine that changes have been made to terms of the license in a particular geographic location, and
    determine that changes have been made to the terms of the license based on a datacenter where the cloud resources are located; and
  responsive to the license being obtainable, allocate the license from the source other than the license service, with adjustments made based on the changes, to the requester.

15. The computer program product of claim 14, the data comprising historical data and real-time data identifying a set of characteristics pertaining to the usage of the set of software installations.

16. The computer program product of claim 15, the set of characteristics comprising at least one of the following: identification of the set of software installations, runtime of the set of software installations, or runtime of the set of VM instances.

17. The computer program product of claim 15, the set of characteristics comprising at least one of: un-installation of any of the set of software installations, or network usage associated with the set of software installations.

18. The computer program product of claim 14, the computer readable hardware storage device further comprising instructions to allocate the license with a predetermined expiration time.

19. The computer program product of claim 14, the computer readable hardware storage device further comprising instructions to evaluate whether the license is obtainable further based on an organizational license policy associated with the requester.

20. The computer program product of claim 14, the networked computing environment comprising a cloud computing environment.

* * * * *